(12) United States Patent
Liu (10) Patent No.: US 7,292,977 B2
(45) Date of Patent: Nov. 6, 2007

(54) SYSTEMS AND METHODS FOR PROVIDING ONLINE FAST SPEAKER ADAPTATION IN SPEECH RECOGNITION

(75) Inventor: Daben Liu, Belmont, MA (US)

(73) Assignee: BBNT Solutions LLC, Cambridge, MA (US)

( * ) Notice: Subject to any disclaimer, the term of this patent is extended or adjusted under 35 U.S.C. 154(b) by 902 days.

(21) Appl. No.: 10/685,565

(22) Filed: Oct. 16, 2003

(65) Prior Publication Data

US 2004/0172250 A1 Sep. 2, 2004

Related U.S. Application Data

(60) Provisional application No. 60/419,214, filed on Oct. 17, 2002.

(51) Int. Cl.
G10L 15/08 (2006.01)
(52) U.S. Cl. .................... 704/236; 704/245
(58) Field of Classification Search ............... None
See application file for complete search history.

(56) References Cited

U.S. PATENT DOCUMENTS

| | | | |
|---|---|---|---|
| 4,879,648 A | 11/1989 | Cochran et al. |
| 4,908,866 A | 3/1990 | Goldwasser et al. |
| 5,317,732 A | 5/1994 | Gerlach, Jr. et al. |
| 5,404,295 A | 4/1995 | Katz et al. |
| 5,418,716 A | 5/1995 | Suematsu |
| 5,544,257 A | 8/1996 | Bellegarda et al. |
| 5,559,875 A | 9/1996 | Bieselin et al. |
| 5,572,728 A | 11/1996 | Tada et al. |
| 5,684,924 A | 11/1997 | Stanley et al. |
| 5,715,367 A | 2/1998 | Gillick et al. |
| 5,752,021 A | 5/1998 | Nakatsuyama et al. |
| 5,757,960 A | 5/1998 | Murdock et al. |
| 5,768,607 A | 6/1998 | Drews et al. |
| 5,777,614 A | 7/1998 | Ando et al. |
| 5,787,198 A | 7/1998 | Agazzi et al. |
| 5,835,667 A | 11/1998 | Wactlar et al. |
| 5,862,259 A | 1/1999 | Bokser et al. |

(Continued)

FOREIGN PATENT DOCUMENTS

EP 0664636 7/1995

(Continued)

OTHER PUBLICATIONS

Cutting, et al "A Practical Part-of-Speech Tagger," Proceedings of the 3rd Conference on Applied Natural Language Processing, ACL 1992, pp. 133-140.

(Continued)

Primary Examiner—Abul K. Azad
(74) Attorney, Agent, or Firm—Ropes & Gray LLP (57) ABSTRACT

A system (230) performs speaker adaptation when performing speech recognition. The system (230) receives an audio segment and identifies the audio segment as a first audio segment or a subsequent audio segment associated with a speaker turn. The system (230) then decodes the audio segment to generate a transcription associated with the first audio segment when the audio segment is the first audio segment and estimates a transformation matrix based on the transcription associated with the first audio segment. The system (230) decodes the audio segment using the transformation matrix to generate a transcription associated with the subsequent audio segment when the audio segment is the subsequent audio segment.

28 Claims, 5 Drawing Sheets

U.S. PATENT DOCUMENTS

| | | |
|---|---|---|
| 5,875,108 A | 2/1999 | Hoffberg et al. |
| 5,960,447 A | 9/1999 | Holt et al. |
| 5,963,940 A | 10/1999 | Liddy et al. |
| 5,970,473 A | 10/1999 | Gerszberg et al. |
| 6,006,221 A | 12/1999 | Liddy et al. |
| 6,024,571 A | 2/2000 | Renegar |
| 6,029,124 A | 2/2000 | Gillick et al. |
| 6,029,195 A | 2/2000 | Herz |
| 6,052,657 A | 4/2000 | Yamron et al. |
| 6,064,963 A | 5/2000 | Gainsboro |
| 6,067,514 A | 5/2000 | Chen |
| 6,067,517 A | 5/2000 | Bahl et al. |
| 6,088,669 A | 7/2000 | Mayes |
| 6,112,172 A | 8/2000 | True et al. |
| 6,151,598 A | 11/2000 | Shaw et al. |
| 6,161,087 A | 12/2000 | Wightman et al. |
| 6,169,789 B1 | 1/2001 | Rao et al. |
| 6,185,531 B1 | 2/2001 | Schwartz et al. |
| 6,219,640 B1 | 4/2001 | Basu et al. |
| 6,317,716 B1 | 11/2001 | Braida et al. |
| 6,332,139 B1 | 12/2001 | Kaneko et al. |
| 6,332,147 B1 | 12/2001 | Moran et al. |
| 6,360,237 B1 | 3/2002 | Schulz et al. |
| 6,373,985 B1 | 4/2002 | Hu et al. |
| 6,381,640 B1 | 4/2002 | Powers et al. |
| 6,434,520 B1 | 8/2002 | Kanevsky et al. |
| 6,437,818 B1 | 8/2002 | Lauwers et al. |
| 6,480,826 B2 | 11/2002 | Petrushin |
| 6,602,300 B2 | 8/2003 | Ushioda et al. |
| 6,604,110 B1 | 8/2003 | Savage et al. |
| 6,647,383 B1 | 11/2003 | August et al. |
| 6,654,735 B1 | 11/2003 | Eichstaedt et al. |
| 6,708,148 B2 | 3/2004 | Gschwendtner et al. |
| 6,714,911 B2 | 3/2004 | Waryas et al. |
| 6,718,303 B2 | 4/2004 | Tang et al. |
| 6,778,958 B1 | 8/2004 | Nishimura et al. |
| 6,792,409 B2 | 9/2004 | Wutte |
| 6,847,961 B2 | 1/2005 | Lapstun et al. |
| 6,922,691 B2 | 7/2005 | Flank |
| 6,931,376 B2 | 8/2005 | Lipe et al. |
| 6,961,954 B1 | 11/2005 | Maybury et al. |
| 6,973,428 B2 | 12/2005 | Boguraev et al. |
| 6,978,277 B2 | 12/2005 | Reed et al. |
| 6,999,918 B2 | 2/2006 | Ma et al. |
| 7,131,117 B2 | 10/2006 | Mills et al. |
| 7,146,317 B2 * | 12/2006 | Bartosik ..................... 704/234 |
| 2001/0026377 A1 | 10/2001 | Ikegami |
| 2001/0051984 A1 | 12/2001 | Fukasawa |
| 2002/0010575 A1 | 1/2002 | Haase et al. |
| 2002/0010916 A1 | 1/2002 | Thong et al. |
| 2002/0059204 A1 | 5/2002 | Harris |
| 2002/0184373 A1 | 12/2002 | Maes |
| 2003/0051214 A1 | 3/2003 | Graham et al. |
| 2003/0093580 A1 | 5/2003 | McGee et al. |
| 2003/0167163 A1 | 9/2003 | Glover et al. |
| 2004/0024739 A1 | 2/2004 | Copperman et al. |
| 2004/0073444 A1 | 4/2004 | Peh et al. |
| 2005/0060162 A1 | 3/2005 | Mohit et al. |
| 2006/0129541 A1 | 6/2006 | Morgan et al. |

FOREIGN PATENT DOCUMENTS

| | | |
|---|---|---|
| EP | 0935378 | 8/1999 |
| EP | 0715298 | 6/2000 |
| EP | 1079313 | 2/2001 |
| EP | 1103952 | 5/2001 |
| EP | 1176493 | 1/2002 |
| EP | 1 422 692 A2 | 5/2004 |
| JP | 361285570 A | 12/1986 |
| WO | WO-99/17235 | 4/1999 |
| WO | WO-00/59223 | 10/2000 |
| WO | WO-02/29612 | 4/2002 |
| WO | WO-02/29614 | 4/2002 |

OTHER PUBLICATIONS

Beeferman et al, "Cyberpunc: A Lightweight Punctuation Annotation System for Speech," Proceedings of the 1999 IEEE Conference on Acoustics, Speech and Signal Processing, ICASSP'98 May 12-15, 1999, 2:689-692.

Shriberg et al, "Can Prosody Aid the Automatic Processing of Multi-Party Meetings? Evidence from Predicting Punctuation, Disfluencies, and Overlapping Speech," Proceedings of the ISCA Tutorial and Research Workshop on Prosody in Speech Recognition and Understanding, Oct. 2001, pp. 139-140.

Guavain et al, "Transcribing Broadcast News Shows," IEEE International Conference on Acoustics, Speech and Signal Processing, ICASSP'97, 2:21-24, Apr. 1997, p. 715-718.

Waibel et al, "Meeting Browser: Tracking and Summarizing Meetings," Proceedings of DARPA Broadcast News Workshop, 1998.

Sean Colbath et al.: "Spoken Documents: Creating Searchable Archives from Continuous Audio," *Proceedings of the 33rd Hawaii International Conference on System Sciences-2000*; pp. 1-9.

Francis Kubala et al.: "Situation Awareness Contexts for Smart Environments," *Inter-Agency Workshop on Research Issues for Smart Environments*; Atlanta, GA; 2000; 3 pages.

Daben Liu et al.: "Fast Speaker Change Detection For Broadcast News Transcription And Indexing," *The Proceedings of Eurospeech 1999*; Budapest, Hungary; 4 pages.

Daniel M. Bikel et al.: "An Algorithm that Learns What's in a Name," *Machine Learning*, 1999; pp. 1-20.

Richard Schwartz et al.: "Accurate Near-Real-Time Recognition of Broadcast News using Multiple-Pass Search Techniques," *1999 Workshop on Automatic Speech Recognition and Understanding*, Dec. 12-15, 1999; Keystone, Colorado; 6 pages.

Francis Kubala et al.: "Smart Information Spaces: Managing Personal and Collaborative Histories," *Proceedings of the 1998 DARPA/NIST Smart Spaces Workshop*, Jul. 30-31, 1998; 6 pages.

Daben Liu et al.: "Improvements in Spontaneous Speech Recognition," *Proceedings of the DARPA Broadcast News Transcription and Understanding Workshop*; Feb. 8-11, 1998, in Lansdowne, Virginia; 5 pages.

Francis Kubala et al.: "The 1997 BBN Byblos System Applied To Broadcast News Transcription," Cambridge, Massachusetts; 1997; 6 pages.

Hubert Jin et al.: "Automatic Speaker Clustering," *ICFEM*, Chantilly, Virginia; Feb. 1997; 4 pages.

Sean Colbath et al.: "OnTAP: Mixed-media Multi-lingual Language Processing," *Human Language Technology Conference*, San Diego, CA; 2002; 2 pages.

Andreas Stolcke et al.: "Automatic Linguistic Segmentation Of Conversational Speech," *Proceedings of the International Conference on Spoken Language Processing*, vol. 2, Philadelphia 1996; pp. 1005-1008.

Scott S. Chen et al.: "Speaker, Environment and Channel Change Detection and Clustering via the Bayesian Information Criterion," in DARPA Speech Recognition Workshop, 1998, 6 pages.

Marti A. Hearst: "Multi-Paragraph Segmentation of Expository Text," in Proceedings of the 2nd Annual Meeting of the Association for Computational Linguistics, New Mexico State University, Las Cruces, NM, 1994, pp. 1-8.

Beigi et al., "A Distance Measure Between Collections of Distributions and its Applications to Speaker Recognition" IEEE International Conference on Acoustics, Speech and Signal Processing, ICASSP'89, May 12-15, 1998, vol. 2, pp. 753-756.

Ferret et al, "A Thematic Segmentation Procedure for Extracting Semantic Domains from Texts".

Amit Srivastava et al.: "Sentence Boundary Detection in Arabic Speech," 8th *European Conference on Speech Communication and Technology*, Sep. 1-4, 2003 in Geneva, Switzerland; 4 pages.

Sreenivasa Sista et al.: "Unsupervised Topic Discovery Applied To Segmentation Of News Transcriptions," 8th *European Conference on Speech Communication and Technology*, Sep. 1-4, 2003 in Geneva. Switzerland; 4 pages.

Daben Liu et al.: "Online Speaker Clustering," *ICASSP 2003*, vol. I, pp. 572-575, 2003 Hong Kong.

J. Billa et al.: "Audio Indexing Of Arabic Broadcast News," *ICASSP 2002*; Orlando, FL; May 13-17, 2002; 4 pages.

Scott Shepard et al.: "Oasis Translator's Aide," *Human Language Technology Conference*; San Diego, California; 2002; 2 pages.

Scott Shepard et al.: "Newsroom OnTAP—Real-time alerting from streaming audio," Dec.-Jan. 2001 HLT Paper; 2 pages.

Heidi Christensen et al.: "Punctuation Annotation using Statistical Prosody Models," *The Proceedings of Eurospeech*, Denmark, 2001; 6 pages.

Ji-Hwan Kim et al.: "The Use of Prosody In A Combined System For Punctuation Generation And Speech Recognition," *The Proceedings of Eurospeech*, Denmark, 2001; 4 pages.

Jing Huang et al.: "Maximum Entropy Model For Punctuation Annotation From Speech," *The Proceedings of Eurospeech*, Denmark, 2001; pp. 917-920.

Yoshihiko Gotoh et al.: "Sentence Boundary Detection in Broadcast Speech Transcripts," *Proceedings of the International Speech Communication Association Workshop: Automatic Speech Recognition: Challenges for the New Millennium*, Paris, Sep. 2000; 8 pages.

John Makhoul et al.: "Speech and Language Technologies for Audio Indexing and Retrieval," *Proceedings of the IEEE*, vol. 88, No. 8, Aug. 2000; pp. 1338-1353.

Francis Kubala et al.: "Integrated Technologies For Indexing Spoken Language," *Communications of the ACM*, vol. 43, No. 2, Feb. 2000; pp. 48-56.

\* cited by examiner

SYSTEMS AND METHODS FOR PROVIDING ONLINE FAST SPEAKER ADAPTATION IN SPEECH RECOGNITION

RELATED APPLICATION

This application claims priority under 35 U.S.C. § 119 based on U.S. Provisional Application No. 60/419,214, filed Oct. 17, 2002, the disclosure of which is incorporated herein by reference.

This application is related to the concurrently-filed U.S. application Ser. No. 10/685,575, titled "Systems and Methods for Classifying Audio into Broad Phoneme Classes," which is incorporated herein by reference.

BACKGROUND OF THE INVENTION

1. Field of the Invention

The present invention relates generally to speech recognition and, more particularly, to systems and methods for providing online fast speaker adaptation in a speech recognition system.

2. Description of Related Art

Speaker information can be used in a speaker-independent speech recognition system to adapt the speech recognition process and, thereby, improve the accuracy of the speech recognition results. The goal of speaker adaptation is not to permanently change the models used by the speech recognition system, but to temporarily adapt the model so that it better represents the words of the speaker whose speech the speech recognition system is trying to recognize.

Figure 1:
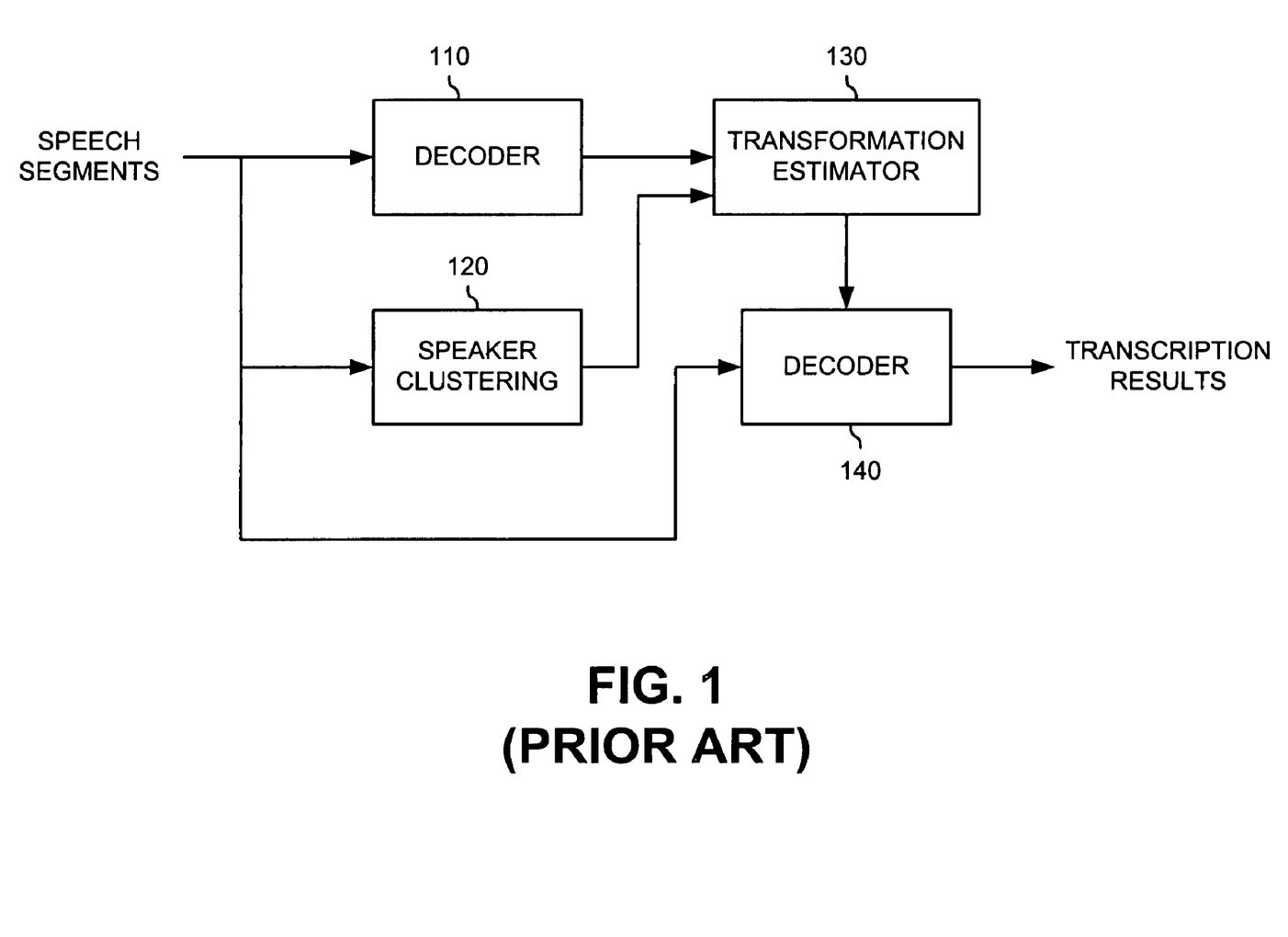
FIG. 1 is a functional block diagram of a conventional speech recognition system.

FIG. 1 is a functional block diagram of a conventional speech recognition system. The system includes a first decoder 110, speaker clustering logic 120, a transformation estimator 130, and a second decoder 140. Decoder 110 receives segments of speech (e.g., utterances) from an audio source. Decoder 110 decodes the speech segments using speaker-independent acoustic models (e.g., Hidden Markov Models (HMMs)) to produce transcriptions of the speech segments. At this point there is no speaker adaptation.

Speaker clustering logic 120 groups speech segments together by speaker. In other words, speaker clustering logic 120 determines which speech segments were produced from the same speaker and groups these segments into clusters. Transformation estimator 130 estimates a transformation matrix for each cluster that, when applied to the audio, moves the audio data closer to the model. To do this, transformation estimator 130 typically collects data, estimates the transformation matrix from the data, and applies the transformation matrix to the models.

Transformation estimator 130 estimates the transformation matrix by accumulating statistics using forward and backward alignment, which is a probabilistic technique for estimating a transformation based on marginal contributions of certain probabilities. Typically, transformation estimator 130 uses straight cepstrals, a first order difference (i.e., a first derivative that indicates the differences between adjacent cepstrals), and a second order difference (i.e., a second derivative that indicates how fast the cepstrals are changing). Transformation estimator 130 uses fourteen features from each group to build a 42×42 transformation matrix that is applied to the audio data.

Decoder 140 then decodes the speech segments with adaptation using the transformation matrices. Because decoder 140 adapts based on the speaker, decoder 140 produces transcriptions of the speech segments that are better than the transcriptions produced by decoder 110.

The conventional system has several drawbacks. For example, the conventional system requires two passes of the decoder (decoder 110 and decoder 140). In other words, each speech segment is decoded twice. Further, the speaker clustering performed by speaker clustering logic 120 is a non-causal function because all of the speech segments must be available before the clustering can be accomplished. These factors result in delays that make a real-time operation impractical.

As a result, there exists a need for systems and methods that improve the performance of speaker adaptation in a speech recognition system.

SUMMARY OF THE INVENTION

Systems and methods consistent with the present invention provide adaptation based on speaker turns in a streamlined and efficient manner that may be used in a real-time environment. Within each speaker turn, the speech may be segmented into small chunks. During decoding of the first chunk, no adaptation may be performed. Adaptation may then be performed on the second and subsequent chunks within the same speaker turn using a transformation matrix that is estimated from the transcriptions resulting from previous chunks.

In one aspect consistent with the principles of the invention, a system performs speaker adaptation when performing speech recognition. The system receives an audio segment and identifies the audio segment as a first audio segment or a subsequent audio segment associated with a speaker turn. The system then decodes the audio segment to generate a transcription associated with the first audio segment when the audio segment is the first audio segment and estimates a transformation matrix based on the transcription associated with the first audio segment. The system decodes the audio segment using the transformation matrix to generate a transcription associated with the subsequent audio segment when the audio segment is the subsequent audio segment.

In another aspect consistent with the principles of the invention, a decoder within a speech recognition system is provided. The decoder includes a forward decoding stage, a backward decoding stage, and a rescoring stage. The forward decoding stage, the backward decoding stage, and/or the rescoring stage is/are configured to receive an audio segment, identify the audio segment as a first audio segment or a subsequent audio segment associated with a speaker turn, decode the audio segment to generate a transcription associated with the first audio segment when the audio segment is the first audio segment, estimate a transformation matrix based on the transcription associated with the first audio segment, and decode the audio segment using the transformation matrix to generate a transcription associated with the subsequent audio segment when the audio segment is the subsequent audio segment.

In yet another aspect consistent with the principles of the invention, a speech recognition system is provided. The speech recognition system includes speaker change detection logic and a decoder. The speaker change detection logic receives audio segments and identifies boundaries between speakers associated with the audio segments as speaker turns. The decoder receives, from the speaker change detection logic, one of the audio segments as a received audio segment associated with one of the speaker turns, and identifies the received audio segment as a first audio segment or a subsequent audio segment associated with the speaker turn. The decoder decodes the received audio segment to generate a transcription associated with the first audio segment when the received audio segment is the first audio segment and constructs a transformation matrix based on the transcription associated with the first audio segment. The decoder decodes the received audio segment using the transformation matrix to generate a transcription associated with the subsequent audio segment when the received audio segment is the subsequent audio segment.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the present invention provide online speaker adaptation based on speaker turns. Within each speaker turn, the speech may be divided into small segments. During decoding, speaker adaptation may be performed on second and subsequent segments within the same speaker turn using a transformation matrix that is estimated from the transcriptions generated from previous segments.

EXEMPLARY SYSTEM

Figure 2:
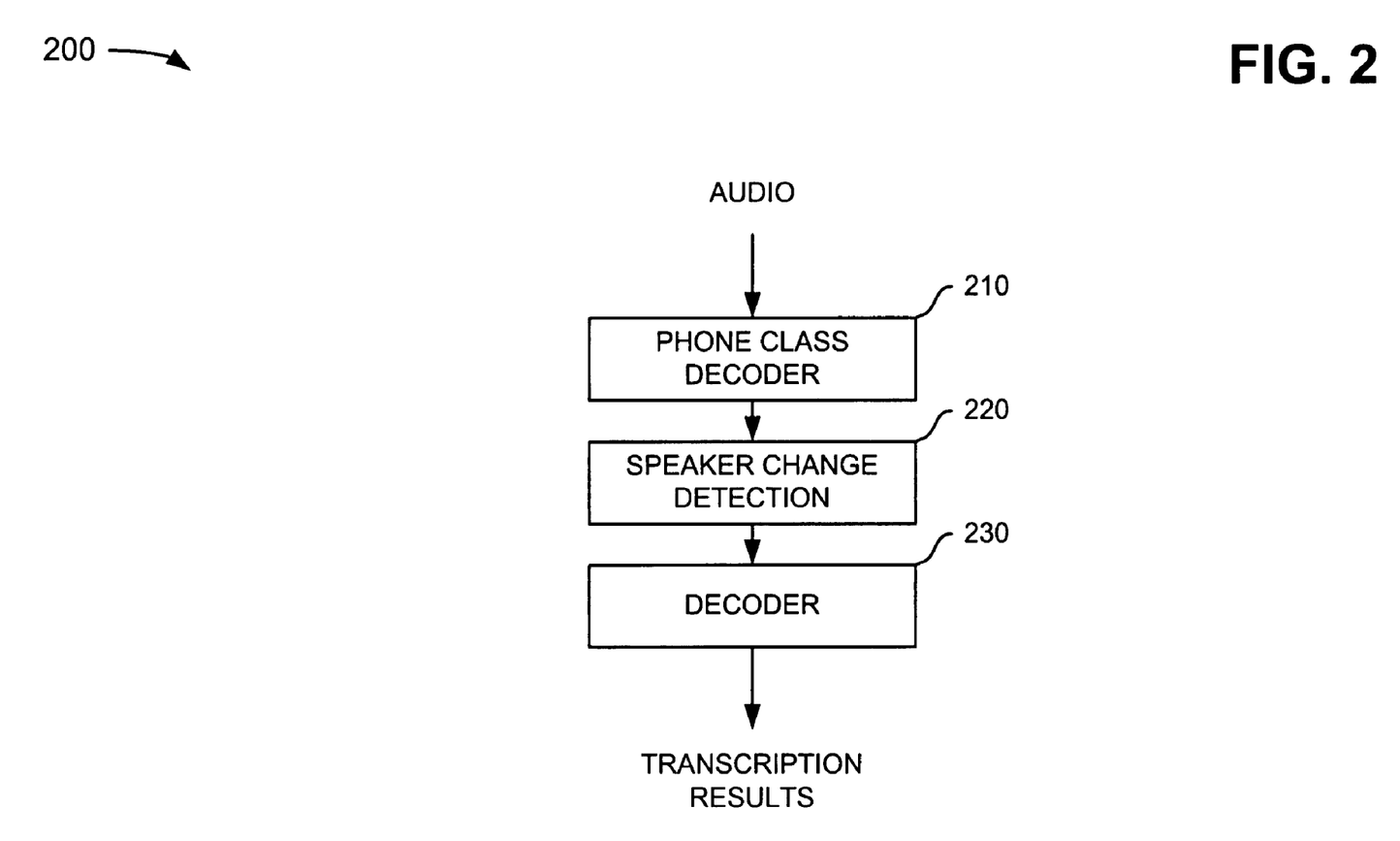
FIG. 2 is a functional block diagram of an exemplary speech recognition system in which systems and methods consistent with the present invention may be implemented.

FIG. 2 is a diagram of an exemplary speech recognition system 200 in which systems and methods consistent with the present invention may be implemented. System 200 may include phone class decoder 210, speaker change detection logic 220, and decoder 230. Phone class decoder 210 may include logic that receives an input audio stream and performs initial signal processing functions on the audio stream. For example, phone class decoder 210 may convert the audio stream into a frequency domain signal and generate cepstral features for the audio data.

Phone class decoder 210 may also classify the audio stream into a number of broad classes, such as vowels, fricatives, narrowband, wideband, coughing, gender, and silence. Phone class decoder 210 may generate an output signal that indicates the classification for a particular portion of the audio stream. The output signal may be a continuous signal or a signal that classifies the audio stream in predetermined length segments (e.g., 30 second chunks).

One implementation of phone class decoder 210 is described in copending U.S. patent application, Ser. No. 10/685585, entitled "Systems and Methods for Classifying Audio into Broad Phoneme Classes," filed on Oct. 16, 2003. Another implementation of phone class decoder 210 is described in D. Liu et al., "Fast Speaker Change Detection for Broadcast News Transcription and Indexing," Proceedings of Eurospeech 99, September 1999, pp. 1031-1034. The preceding two documents are incorporated herein by reference.

Speaker change detection logic 220 may locate the boundaries between speakers (i.e., speaker turns) in the input audio stream. Speaker change detection logic 220 may also divide the audio stream into approximately four second segments within the speaker turns. To identify the speaker turns, speaker change detection logic 220 may implement techniques similar to those described in J. Makhoul et al., "Speech and Language Technologies for Audio Indexing and Retrieval," Proceedings of the IEEE, Vol. 88, No. 8, August 2000, pp. 1338-1353, which is incorporated herein by reference. Speaker change detection logic 220 may output audio data as approximately four second segments with indications of changes in speaker turns.

Figure 3:
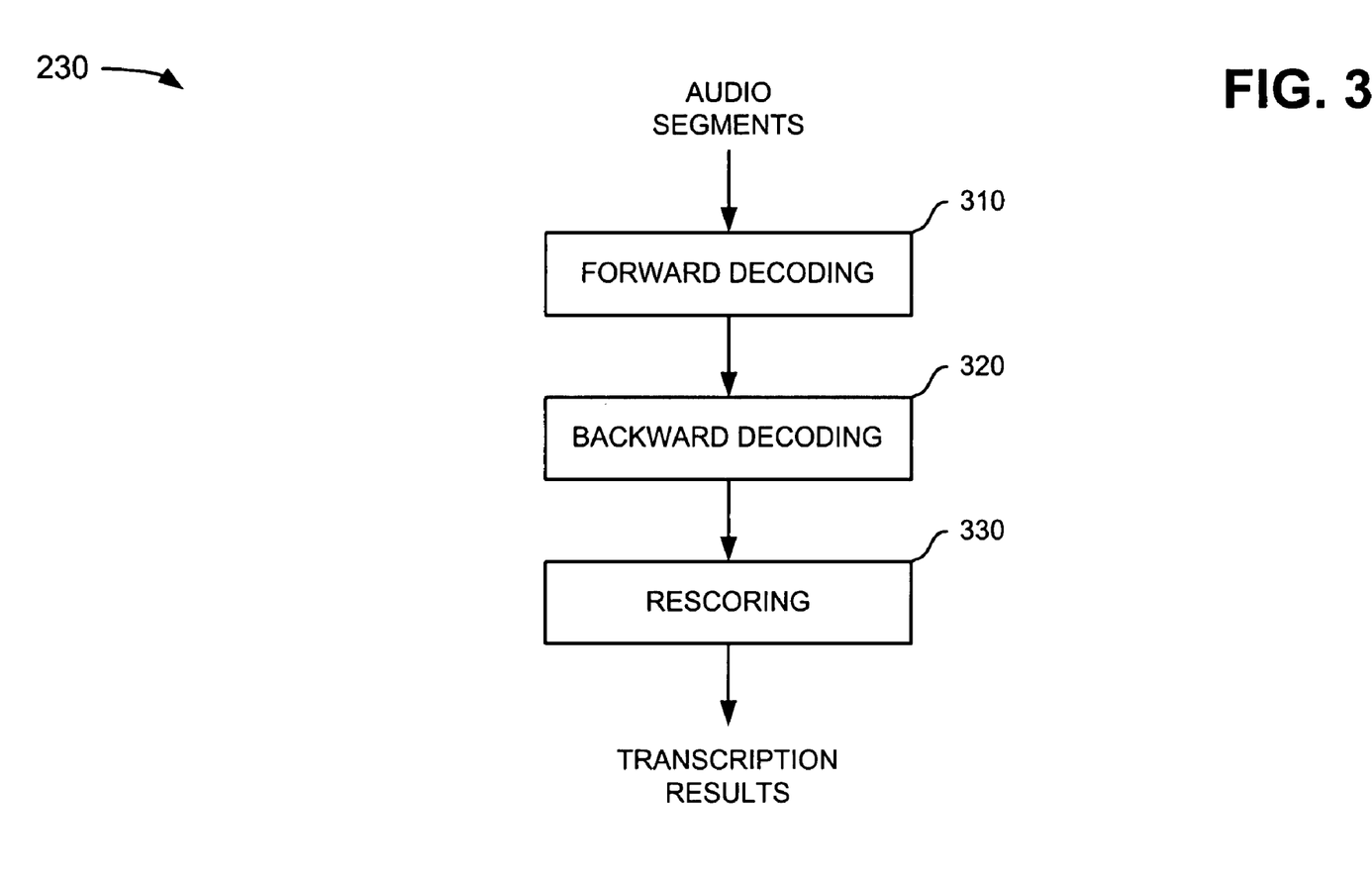
FIG. 3 is an exemplary functional block diagram of the decoder of FIG. 2 according to an implementation consistent with the principles of the invention.

Decoder 230 may perform speaker adaptation to generate transcription results based on the audio segments and the speaker turns. FIG. 3 is an exemplary functional block diagram of decoder 230 according to an implementation consistent with the principles of the invention. Decoder 230 may include forward decoding stage 310, backward decoding stage 320, and rescoring stage 330. Forward decoding stage 310, backward decoding stage 320, and rescoring stage 330 may use acoustic models, such as Hidden Markov Models (HMMs), to generate transcripts of the audio segments.

Forward decoding stage 310 may include a very robust HMM and perform a very fast rough match. Forward decoding stage 310 may attempt to narrow the search space for a correct answer, but does not try to find the correct answer. Instead, forward decoding stage 310 simply makes sure not to lose the correct answer. Backward decoding stage 320 may include a more complex HMM and perform a slower, more accurate match. Backward decoding stage 320 starts with a smaller search space (i.e., the search space narrowed by forward decoding stage 310) and narrows the search space even further.

Rescoring stage 330 may include an even more complex HMM and perform a slower accurate match. Rescoring stage 330 starts with a much smaller search space (i.e., the search space narrowed by forward decoding stage 310 and backward decoding stage 320) and selects the best answer (i.e., the correct word). Each of these stages progressively narrows the search space to find the correct word.

Figure 4:
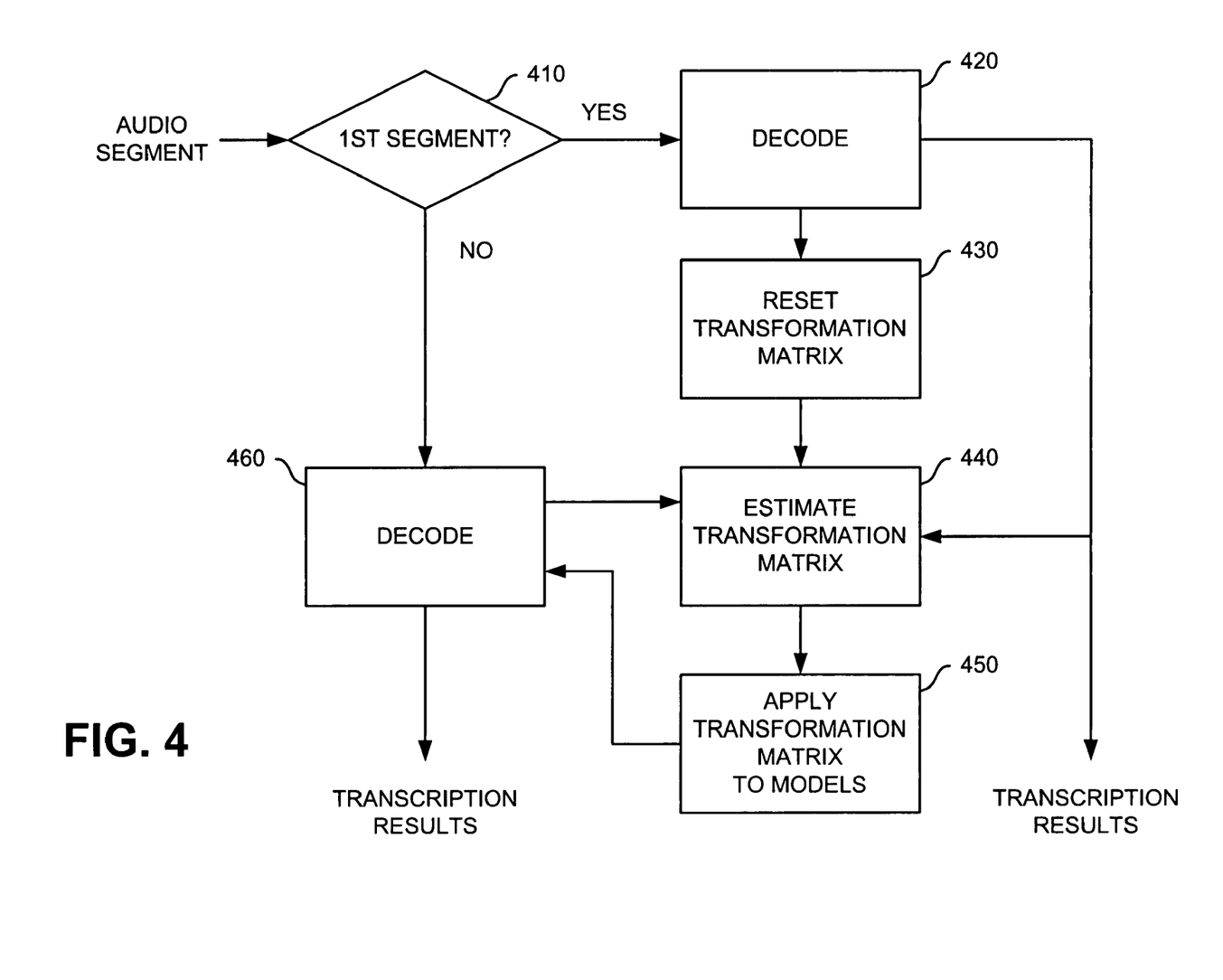
FIG. 4 is a flowchart of exemplary processing by one or more of the elements of FIG. 3 according to an implementation consistent with the present invention.

Speaker adaptation may apply to any or all of these stages. FIG. 4 is a flowchart of exemplary processing for speaker adaptation according to an implementation consistent with the principles of the invention. The following acts will be described as occurring in forward decoding stage 310. It should be understood, however, that these acts are also performed in backward decoding stage 320 and/or rescoring stage 330.

Processing may begin when forward decoding stage 310 receives an audio segment (e.g., an utterance) from speaker change detection logic 220. Forward decoding stage 310 may determine whether this audio segment is a first audio segment of a speaker turn (act 410). First audio segments may be identified by speaker change indications provided by speaker change detection logic 220. If the audio segment is a first audio segment, then forward decoding stage 310 may decode the audio segment using one or more speaker-independent HMMs to obtain transcription results (act 420).

Forward decoding stage 310 may then reset the transformation matrix for the current speaker to a predetermined state (act 430). The transformation matrix may be reset because information regarding a different speaker is typically not useful when trying to decode speech from the current speaker.

Forward decoding stage 310 may then estimate the transformation matrix based on transcription results and, possibly, other features associated with the first audio segment (act 440). Unlike conventional approaches that use fourteen features associated with each of the straight cepstrals, the first order difference, and the second order difference to build a 42×42 matrix, first decoding stage 310 may use only the fourteen features associated with the straight cepstrals to build a 14×14 matrix according to an implementation consistent with the principles of the invention. In this way, forward decoding stage 310 need only estimate a 14×14 matrix instead of a 42×42 matrix. To construct the 42×42 matrix, forward decoding stage 310 may replicate the 14×14 matrix three times.

Figure 5:
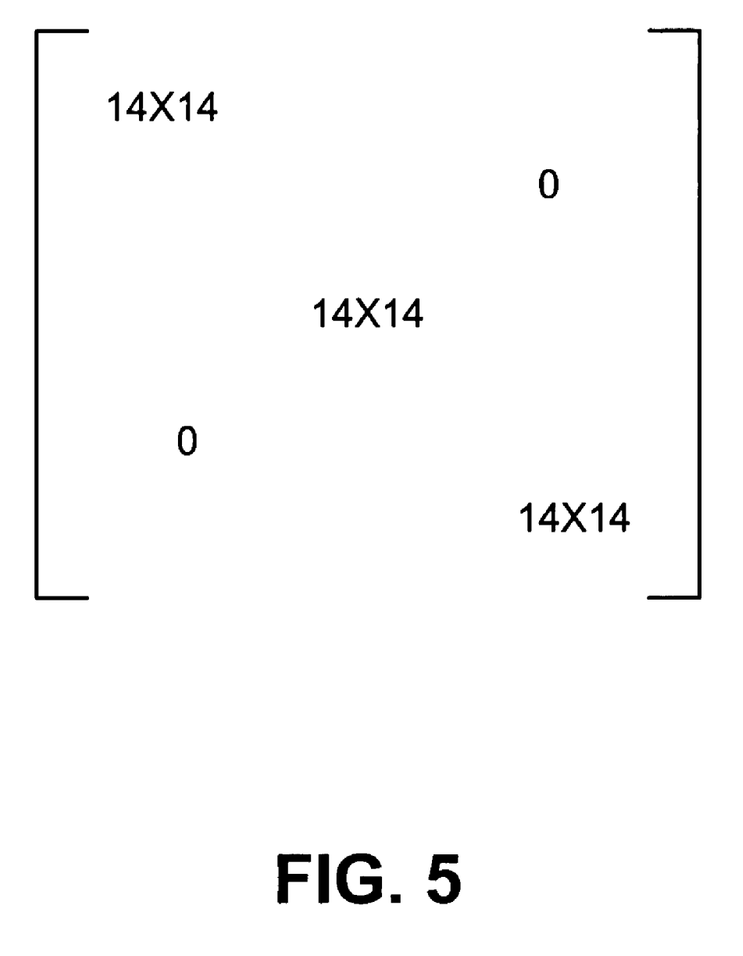
FIG. 5 is an exemplary diagram of a transformation matrix according to an implementation consistent with the present invention.

FIG. 5 is an exemplary diagram of a transformation matrix according to an implementation consistent with the present invention. As shown in FIG. 5, the 14×14 matrix is replicated along the diagonal of the 42×42 matrix. The rest of the matrix may be filled with a predetermined value, such as zero. In other implementations consistent with the present invention, the 14×14 matrix appears in other locations within the 42×42 matrix.

Returning to FIG. 4, when identifying the values for the transformation matrix, forward decoding stage 310 may use a known statistical alignment technique, such as the Viterbi alignment. Unlike conventional approaches that use probabilistic techniques, the Viterbi alignment is a statistical alignment that aligns the answers with the audio data, scores them, and takes the highest score. Forward decoding stage 310 may then apply the transformation matrix to the models in a conventional manner (act 450).

When the audio segment received by forward decoding stage 310 is not the first audio segment in a speaker turn, then forward decoding stage 310 may decode the audio segment using the transformation matrix to obtain transcription results (act 460). Forward decoding stage 310 may then use the transcription results to reestimate the transformation matrix (act 440). The transformation matrix is a cumulative matrix that is incrementally improved with every audio segment in a speaker turn. The matrix may be reestimated with each new segment from the same speaker. This serves to incrementally improve the transformation matrix and, thus, the transcription results.

Returning to FIG. 3, forward decoding stage 310, backward decoding stage 320, and rescoring stage 330 perform incremental speaker adaptation according to an implementation consistent with the principles of the invention. Forward decoding stage 310 receives audio segments from speaker change detection logic 220 in approximately four second utterances. When an audio segment corresponds to a first audio segment in a speaker turn, forward decoding stage 310 may reset its transformation matrix. Forward decoding stage 310 may then process the audio segments in a manner similar to that described above and output them to backward decoding stage 320 in approximately four second utterances.

Backward decoding stage 320 may receive the audio segments from forward decoding stage 310. When an audio segment corresponds to a first audio segment in a speaker turn, backward decoding stage 320 may reset its transformation matrix. Backward decoding stage 320 may then process the audio segments in a manner similar to that described above and output them to rescoring stage 330 in approximately four second utterances. Rescoring stage 330 may receive the audio segments from backward decoding stage 320. When an audio segment corresponds to a first audio segment in a speaker turn, rescoring stage 330 may reset its transformation matrix. Rescoring stage 330 may then process the audio segments in a manner similar to that described above and output transcription results.

In an alternate implementation consistent with the principles of the invention, backward decoding stage 320 and/or rescoring stage 330 may perform speaker-turn-based adaptation instead of the incremental adaptation described above. According to speaker-turn-based adaptation, backward decoding stage 320 and/or rescoring stage 330 may wait for the entire speaker turn to complete in the previous stage before decoding the audio segments of the speaker turn. In this way, the transcription results generated by the previous stage(s) may be used to construct the transformation matrix. The transformation matrix may then be used to decode the audio segments, including the first audio segment, in the speaker turn.

In yet another implementation consistent with the principles of the invention, backward decoding stage 320 and/or rescoring stage 330 may use information from the previous stage(s) when performing adaptation. For example, when backward decoding stage 320 processes a second audio segment in a speaker turn, backward decoding stage 320 may use information (e.g., transcription results) generated by forward decoding stage 310 when processing the first and second audio segments and information (e.g., transcription results) generated by backward decoding stage 320 when processing the first audio segment to construct the transformation matrix.

CONCLUSION

Systems and methods consistent with the present invention provide online speaker adaptation based on speaker turns. Within each speaker turn, the speech may be segmented into small chunks. Speaker adaptation may be performed on second and subsequent chunks within the same speaker turn using a transformation matrix that is estimated from the transcriptions resulting from previous chunks.

The following benefits may be obtained by an online speaker adaptation process according to an implementation consistent with the principles of the invention. For example, the speaker adaptation process involves only a single pass of the decoder (see FIG. 4), unlike conventional approaches that require two passes of the decoder. The speaker adaptation process is a real-time streamlined process, unlike conventional approaches that use speaker clustering and its inherent delays. The speaker adaptation process uses only straight cepstrals to estimate a 14×14 matrix instead of conventional approaches that required estimation of a 42×42 matrix. The speaker adaptation process may use a statistical alignment process, such as Viterbi alignment, to perform the transformation. Viterbi alignment is faster and involves less computations than conventional approaches that use probabilistic techniques.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while a series of acts has been described with regard to FIG. 4, the order of the acts may differ in other implementations consistent with the principles of the invention. Also, non-dependent acts may be performed in parallel.

Further, certain portions of the invention have been described as "logic" that performs one or more functions. This logic may include hardware, such as an application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method for performing speaker adaptation in a speech recognition system, comprising:
    receiving an audio segment;
    determining whether the audio segment is a first audio segment associated with a speaker turn;
    decoding the audio segment to generate a transcription associated with the first audio segment when the audio segment is the first audio segment;
    estimating a transformation matrix based on the transcription associated with the first audio segment; and
    decoding the audio segment using the transformation matrix to generate a transcription associated with a subsequent audio segment when the audio segment is not the first audio segment.

2. The method of claim 1, wherein the determining whether the audio segment is a first audio segment includes:
    receiving information identifying a start of the speaker turn, and
    identifying the audio segment as the first audio segment based on the information.

3. The method of claim 1, wherein the determining whether the audio segment is a first audio segment includes:
    identifying a start of the speaker turn.

4. The method of claim 3, further comprising:
    resetting the transformation matrix upon identifying the start of the speaker turn.

5. The method of claim 1, further comprising:
    reestimating the transformation matrix based on the transcription associated with the subsequent audio segment to obtain a reestimated transformation matrix.

6. The method of 5, further comprising:
    receiving another audio segment associated with the speaker turn; and
    decoding the other audio segment using the reestimated transformation matrix.

7. The method of claim 1, further comprising:
    applying the transformation matrix to one or more acoustic models.

8. The method of claim 7, wherein the decoding the audio segment using the transformation matrix includes:
    using the one or more acoustic models to generate the transcription associated with the subsequent audio segment.

9. The method of claim 1, wherein the estimating a transformation matrix includes:
    constructing a matrix using features associated with straight cepstrals corresponding to the audio segment, and
    replicating the matrix to generate the transformation matrix.

10. The method of claim 1, wherein the estimating a transformation matrix includes:
    using a statistical alignment technique to obtain values for the transformation matrix.

11. The method of claim 10, wherein the statistical alignment technique is a Viterbi alignment technique.

12. A system for performing speaker adaptation when performing speech recognition, comprising:
    means for receiving an audio segment;
    means for identifying the audio segment as a first audio segment or a subsequent audio segment associated with a speaker turn;
    means for decoding the audio segment to generate a transcription associated with the first audio segment when the audio segment is the first audio segment;
    means for estimating a transformation matrix based on the transcription associated with the first audio segment; and
    means for decoding the audio segment using the transformation matrix to generate a transcription associated with the subsequent audio segment when the audio segment is the subsequent audio segment.

13. A decoder within a speech recognition system, comprising:
    a forward decoding stage;
    a backward decoding stage; and
    a rescoring stage;
    at least one of the forward decoding stage, the backward decoding stage, and the rescoring stage being configured to:
        receive an audio segment,
        identify the audio segment as a first audio segment or a subsequent audio segment associated with a speaker turn,
        decode the audio segment to generate a transcription associated with the first audio segment when the audio segment is the first audio segment,
        estimate a transformation matrix based on the transcription associated with the first audio segment, and
        decode the audio segment using the transformation matrix to generate a transcription associated with the subsequent audio segment when the audio segment is the subsequent audio segment.

14. The decoder of claim 13, wherein when identifying the audio segment, the at least one of the forward decoding stage, the backward decoding stage, and the rescoring stage is configured to:
    receive information identifying a start of the speaker turn, and
    identify the audio segment as the first audio segment when the information is received.

15. The decoder of claim 13, wherein when identifying the audio segment, the at least one of the forward decoding stage, the backward decoding stage, and the rescoring stage is configured to:
    identify a start of the speaker turn.

16. The decoder of claim 15, wherein the at least one of the forward decoding stage, the backward decoding stage, and the rescoring stage is further configured to:
    reset the transformation matrix upon identifying the start of the speaker turn.

17. The decoder of claim 13, wherein the at least one of the forward decoding stage, the backward decoding stage, and the rescoring stage is further configured to:
    reestimate the transformation matrix based on the transcription associated with the subsequent audio segment to obtain a reestimated transformation matrix.

18. The decoder of 17, wherein the at least one of the forward decoding stage, the backward decoding stage, and the rescoring stage is further configured to:
- receive another audio segment associated with the speaker turn, and
- decode the other audio segment using the reestimated transformation matrix.

19. The decoder of claim 13, wherein the at least one of the forward decoding stage, the backward decoding stage, and the rescoring stage is further configured to:
- apply the transformation matrix to one or more acoustic models.

20. The decoder of claim 19, wherein when decoding the audio segment using the transformation matrix, the at least one of the forward decoding stage, the backward decoding stage, and the rescoring stage is configured to:
- use the one or more acoustic models to generate the transcription associated with the subsequent audio segment.

21. The decoder of claim 13, wherein when estimating a transformation matrix, the at least one of the forward decoding stage, the backward decoding stage, and the rescoring stage is configured to:
- construct a matrix using features associated with straight cepstrals corresponding to the audio segment, and
- replicate the matrix to generate the transformation matrix.

22. The decoder of claim 13, wherein when estimating a transformation matrix, the at least one of the forward decoding stage, the backward decoding stage, and the rescoring stage is configured to:
- use a statistical alignment technique to obtain values for the transformation matrix.

23. The decoder of claim 22, wherein the statistical alignment technique is a Viterbi alignment technique.

24. The decoder of claim 13, wherein the backward decoding stage is configured to use transcriptions from the forward decoding stage when estimating the transformation matrix.

25. The decoder of claim 24, wherein the backward decoding stage is configured to wait until transcriptions corresponding to the entire speaker turn are received before estimating the transformation matrix.

26. The decoder of claim 13, wherein the rescoring stage is configured to use transcriptions from at least one of the forward decoding stage and the backward decoding stage when estimating the transformation matrix.

27. The decoder of claim 26, wherein the rescoring stage is configured to wait until transcriptions corresponding to the entire speaker turn are received before estimating the transformation matrix.

28. A speech recognition system, comprising:
- speaker change detection logic configured to:
  - receive a plurality of audio segments, and
  - identify boundaries between speakers associated with the audio segments as speaker turns; and
- a decoder configured to:
  - receive, from the speaker change detection logic, one of the audio segments as a received audio segment associated with one of the speaker turns,
  - identify the received audio segment as a first audio segment or a subsequent audio segment associated with the speaker turn,
  - decode the received audio segment to generate a transcription associated with the first audio segment when the received audio segment is the first audio segment,
  - construct a transformation matrix based on the transcription associated with the first audio segment, and
  - decode the received audio segment using the transformation matrix to generate a transcription associated with the subsequent audio segment when the received audio segment is the subsequent audio segment.

* * * * *